(12) United States Patent
Jiang et al.

(10) Patent No.: US 6,836,356 B2
(45) Date of Patent: Dec. 28, 2004

(54) ALKALI-METAL-FREE PHOSPHATE GLASS WITH DN/DT ≈ 0 FOR USE IN FIBER AMPLIFIERS

(75) Inventors: Shibin Jiang, Tucson, AZ (US); Karine Seneschal, Mainz (DE); Tao Luo, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 244 days.

(21) Appl. No.: 10/125,189

(22) Filed: Apr. 18, 2002

(65) Prior Publication Data

US 2003/0197921 A1 Oct. 23, 2003

(51) Int. Cl.$^7$ ................................................ H01S 3/00
(52) U.S. Cl. ................................................ 359/341.5
(58) Field of Search ........................ 359/341.5; 65/390

(56) References Cited

U.S. PATENT DOCUMENTS

| | | | |
|---|---|---|---|
| 4,022,707 A | * 5/1977 | Deutschbein et al. . | 252/301.6 P |
| 4,225,459 A | * 9/1980 | Faulstich et al. ..... | 252/301.4 P |
| 4,333,848 A | 6/1982 | Myers et al. ............ | 252/301.4 |
| 4,929,387 A | * 5/1990 | Hayden et al. ....... | 252/301.4 P |
| 4,962,067 A | 10/1990 | Myers ......................... | 501/45 |
| 5,526,369 A | * 6/1996 | Hayden et al. ............... | 372/40 |
| 5,533,163 A | * 7/1996 | Muendel ...................... | 385/126 |
| 6,654,390 B2 | * 11/2003 | Spiegelberg et al. ........... | 372/6 |
| 2002/0089711 A1 | * 7/2002 | Conzone et al. ............ | 359/109 |
| 2003/0137722 A1 | * 7/2003 | Nikolajsen et al. ...... | 359/341.1 |

OTHER PUBLICATIONS

T. Nishi et al., The amplification properties of highly Er=3 doped phosphate fiber, Jpn. J. Appl. Phys., vol. 31, 1992, Pt. 2, 2B, Pgs. L177–L179.

Shibin Jiang et al., Net gain of 15.5 dB from a 5.1 cm–long Er=–doped phosphate glass fiber, OFC 2000 Technical Digest Series, Mar. 7–10, 2000, PD5-1–PD5-2.

Michael R. Lange et al., High Gain Short Length Phosphate Glass Erbium–Doped Fiber Amplifier Materials, OSA Optical Fiber Communications, 2001, Pgs. 1–8.

B.C. Hwang et al., Erbium–doped phosphate glass fibre amplifiers with gain per unit length of 2.1 dB/cm, Electronics Letters, Jun. 10, 1999, vol. 35, No. 12, Pgs. 1–2.

Yongdan Hu et al., Performance of High–Concentration Er3=–Yb3=–Codoped Phosphate Fiber Amplifiers, IEEE Photonics Technology Letters, Jul. 2001, vol. 13, No. 7, Pgs. 657–659.

Shibin Jiang et al., Er3= doped phosphate glasses and lasers, Journal of Non–Crystalline Solids 239, 1998, Pgs. 143–148.

Shibin Jiang et al., Er3=–doped phosphate glasses for fiber amplifiers with high gain per unit length, Journal of Non–Crystalline Solids 263 & 264, 2000, Pgs. 364–368.

S. Iraj Najafi, Overview of Nd–and Er–Doped Glass Integrated Optics Amplifiers and Lasers, SPIE, vol. 2996, Pgs. 54–61.

* cited by examiner

*Primary Examiner*—Mark Hellner
*Assistant Examiner*—Deandra M. Hughes
(74) *Attorney, Agent, or Firm*—Eric A. Gifford

(57) ABSTRACT

Phosphate glass fibers are an attractive alternative to silica fibers because they can be co-doped with much higher concentrations of Yb and Er and exhibit a higher optical gain per unit length. However, in such fibers the absorption of the pump is high and heating effects caused by the pump laser can cause a significant change in refractive index. This problem is overcome with a phosphate glass composition that exhibits a temperature coefficient of refractive index $\beta = dn/dT$ close to zero. This is achieved by avoiding alkali metal oxides in the glass composition and by adjusting the concentration of the network modifiers such as BaO.

24 Claims, 7 Drawing Sheets

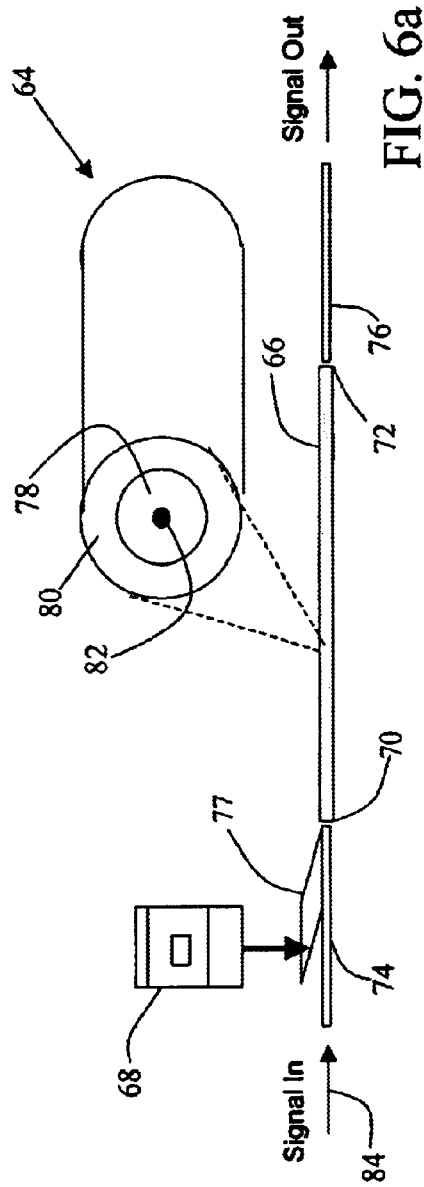
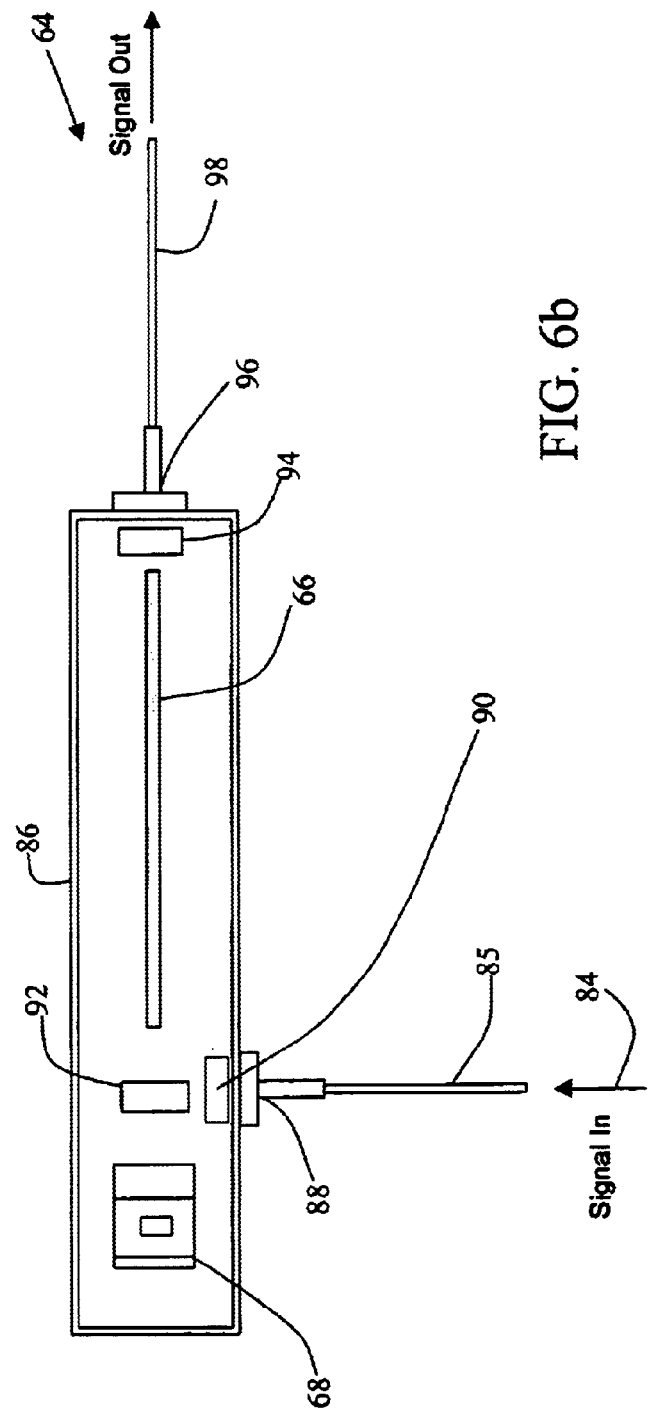

ALKALI-METAL-FREE PHOSPHATE GLASS WITH DN/DT ≈ 0 FOR USE IN FIBER AMPLIFIERS

CROSS-REFERENCE TO RELATED APPLICATIONS

This application claims benefit of priority under 35 U.S.C. 120 to U.S. Pat. No. 6,611,372 entitled "Erbium and Ytterbium Co-Doped Phosphate Glass Optical Fiber Amplifiers Using Short Active Fiber Length" filed on Jun. 9, 2000, the entire contents of which are incorporated by reference.

BACKGROUND OF THE INVENTION

1. Field of the Invention

This invention relates to alkali-metal-free phosphate glasses and more specifically to glasses that exhibit a temperature coefficient of refractive index ($\beta$=dn/dT) close to zero for use in fiber amplifiers.

2. Description of the Related Art

With the deployment of the optical network, erbium doped fiber amplifiers (EDFAs) are in high demand because they enable the periodic optical reamplification of the optical signal. This amplification is required to balance the small absorption in the silica single mode fibers used to carry the optical signal. In standard EDFAs, optical gain and amplification are provided by doping the fiber glass with rare-earth dopants such as Er. The concentration of these dopants varies with the nature and composition of the glass matrix. There has been a strong incentive to dope Er into silica-based fibers to maintain their compatibility, and connectivity with standard silica telecommunication fibers using fusion splicing. However, in silica-based glass the concentration of Er has to be kept small to prevent quenching and clustering of the dopant, resulting in low gain per unit length. Due to limited gain per unit length, standard EDFAs are comprised of several meters of doped silica-based fibers. Fiber management increases the cost of the amplifier and its footprint.

In contrast to silica-based glasses, multi-component glasses can accommodate much higher rare-earth dopants leading the higher optical gain per unit length. Multi-component glasses are comprised of a glass network former, glass network intermediators, and glass network modifiers. Multi-component glasses based on a phosphate glass former have been developed for use in solid-state lasers and are described for instance in U.S. Pat. No. 4,333,848. To increase the absorption of the pump light, Er doped glasses are co-doped with Yb. In this case, the Yb atoms get excited by absorbing photons from the pump light and they transfer their energy to Er atoms. Yb/Er phosphate glasses were used in lasers, where as gain medium they were placed inside a cavity. Such lasers are described for instance in Jiang 1998, "Er$^{3+}$ doped phosphate glasses and lasers," J. of Non-crystalline solids 239, p. 143. The glasses were shaped into rods with a diameter of 5 mm.

To operate efficiently in flashlamp-pumped lasers 10 of the type shown in FIG. 1a, the active medium (the phosphate glass rod 12 of length l), which is positioned between reflectors 14 and 16 to form a laser cavity, must be uniformly and effectively pumped by an incoherent broad spectrum pump 18 to provide a homogeneous gain profile. The optical gain must exceed the optical losses of the cavity to reach the laser threshold and subsequent laser emission 20. For stable laser emission the length L of the optical path length of the cavity must be kept constant during laser operation. Since flashlamps have a spectrally broad emission spectrum 22 (see FIG. 1b), only a small fraction of the photons get absorbed by the gain medium (here the Yb ions). This situation is very different from that of erbium doped fiber amplifiers (EDFAs) in which a coherent spectrally narrow laser 24 is used to pump the gain medium. The broadband and incoherent nature of the light provided by flashlamps has an important consequence: to reach the threshold for population inversion and sufficient gain the total intensity of the flashlight is very high and its infra-red part of the spectrum that does not overlap with the Yb optical transition generates a lot of heat in the gain medium.

Hence, to get effectively pumped from the side (see cross-sectional view FIG. 1c) with the photons delivered by the flashlamp the phosphate glass rod must contain a high concentration of Yb. Likewise, since the power delivered by a flashlamp is limited, the Er concentration in a laser has to be kept relatively low. This is because the threshold for population inversion of Er in co-doped Yb/Er glasses is increasing with concentration of Er. For instance, Myers in U.S. Pat. No. 4,962,067 teaches that (column 5 lines 38–42) "It will be appreciated by those skilled in the art that sensitization in this manner allows a relatively low erbium concentration to be utilized such that the necessary population inversion can be more readily achieved."

When pumped with flashlamps, solid-state lasers are always subjected to a lot a heat. Since the phosphate glass rods get heated substantially, they expand. This expansion changes the optical path 26 of the cavity as illustrated in FIG. 1d. The optical path OP for the laser cavity shown in FIG. 1a is given by:

$$OP = n_G l + n_{air}(L-l) \tag{1}$$

where $n_G$ is the refractive index of the glass, $n_{air}$ is the refractive index of air, l is the length of the glass rod and L the total length of the cavity.

Due to heating, the optical path in the cavity is changed by two effects that occur simultaneously: 1) thermal expansion of the phosphate glass rod, and 2) a change of its refractive index. The thermal expansion is characterized by the coefficient of linear thermal expansion α given by:

$$\alpha = \frac{1}{l_0}\frac{dl}{dT} \tag{2}$$

where $l_0$ is the length of the glass rod at room temperature. The change in refractive index is characterized by the temperature coefficient of refractive index β given by:

$$\beta = \frac{dn}{dT} \tag{3}$$

The change in optical path length is characterized by the thermal coefficient of optical path length w given by:

$$w = \beta + (n_G - n_{air})\alpha \tag{4}$$

Since α is a positive coefficient, it becomes clear from Eq. (4) that a negative value for the temperature coefficient of refractive index β is required to keep the optical path constant in the laser cavity. Thus, the composition of Yb/Er doped phosphate glasses for lasers must be adjusted to provide for a negative value of β.

A negative value of β means that the refractive index of the glass decreases when the temperature is increased. For instance, Myers in U.S. Pat. No. 4,962,067 teaches that (column 5 lines 52–56) "The laser glasses of the present invention are relatively athermal and demonstrate a negative change in refractive index with temperature which nearly compensates for their positive coefficient of thermal expansion."

Yb/Er co-doped glasses have also been proposed in fiber amplifiers. A schematic representation of a fiber amplifier 30 is given in FIG. 2. A signal 32 and a pump laser beam 34 are propagating in the core 36 of an Yb/Er doped phosphate glass fiber. The diameter of the core and its refractive index relative to that of the cladding 38 are carefully adjusted such that the fiber core supports only a single mode at the wavelength of the signal. The refractive index of the core has to be higher than that of the cladding to confine the pump and signal beam in the core. A substantial change in the refractive index difference between the core and cladding will change the transverse profile of the signal beam in the core and will affect the propagation of the signal. In particular, if the refractive index in the core is reduced substantially, the confinement of the signal beam can be lost and the fiber amplifier operation will fail. In traditional Yb/Er doped fibers based on silica-based glasses, the concentration of Yb and Er are small and lead to a small absorption coefficient for the pump. Consequently, silica erbium doped amplifiers consist of fibers with a length of several meters and exhibit β>0. In such fibers, the heating caused by the pump is not critical because the absorption coefficient is really small, hence the change in the refractive index is small. Unfortunately, Yb/Er co-doped silica-based fibers amplifiers are expensive and have large foot print due to the management of the long fiber.

SUMMARY OF THE INVENTION

In view of the above problems, the present invention provides a phosphate glass capable of supporting high concentrations of Er and Yb suitable for use in inexpensive compact fiber amplifiers.

This is accomplished with a phosphate glass composition that exhibits a temperature coefficient of refractive index β=dn/dT close to zero. This is achieved by avoiding alkali metal oxides in the glass composition and by adjusting the concentration of the network modifiers such as BaO.

Phosphate glass fibers are an attractive alternative to silica fibers because they can be co-doped with much higher concentrations of Yb and Er and exhibit a higher optical gain per unit length. With such glasses compact and lower cost amplifiers can be fabricated. However, in such fibers the absorption of the pump is high and heating effects caused by the pump laser can cause a significant change in refractive index. This heating effect is even more important when low cost high power multimode pumping is used. In this case, a non-zero temperature coefficient of the refractive index can have an adverse effect on the waveguide mode properties of the signal. Therefore, a temperature coefficient of refractive index β=dn/dT close to zero is desired in phosphate glass compositions for fiber amplifiers.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a through 6d are simplified schematics of single and double pass multi-mode clad-pumped EMFAs using an alkali-metal-free phosphate glass fiber in accordance with the present invention.

DETAILED DESCRIPTION OF THE INVENTION

Phosphate glass fibers are an attractive alternative to silica fibers because they can be co-doped with much higher concentrations of Yb and Er and exhibit a higher optical gain per unit length. The absorption of the pump is high and heating effects caused by the pump laser can cause a significant change in refractive index. This heating effect is even more important when low cost high power multimode pumping is used. Holding the pump at a setpoint temperature through active cooling may still induce a thermal gradient across the fiber sufficient to distort the fiber's mode profile.

A negative temperature coefficient of the refractive index can have an adverse effect on the waveguide mode properties of the signal. Therefore, a temperature coefficient of refractive index β=dn/dT close to zero, e.g. suitably from $-2.0 \times 10^{-6}$ to $+2.0 \times 10^{-6}$ K$^{-1}$ and preferably $-1.0 \times 10^{-6}$ to $+1.0 \times 10^{-6}$ K$^{-1}$, is desired in phosphate glass compositions for fiber amplifiers. This is achieved by avoiding alkali metal oxides in the glass composition and by adjusting the concentration of the network modifiers such as BaO. Alkali-metal-free glass has demonstrated improved mechanical and chemical durability. Maintaining a temperature coefficient of the optical path length is not as critical as in a laser glass since the beam in the fiber amplifier is confined by the cladding layer. Nonetheless, a fiber amplifier for telecommunication application has to pass a standard Bellcore test, where the temperature changes from −40° C. to 80° C.

Alkali-Metal-Free Phosphate Glass

Figure 1C:
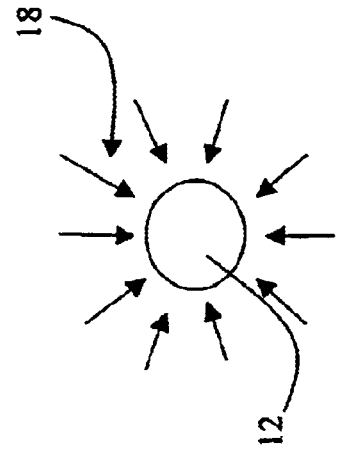
FIGS. 1a through 1d, as described above, are illustrations of a solid-state flashlamp pumped laser.
Figure 1D:
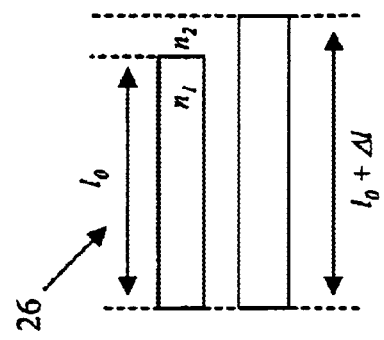
Figure 1A:
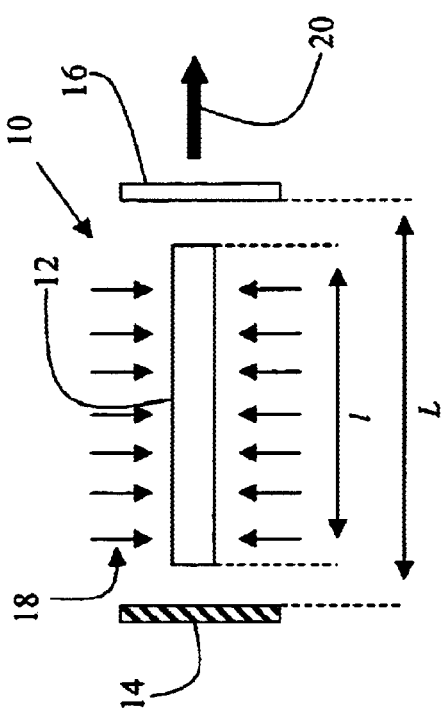
Figure 1B:
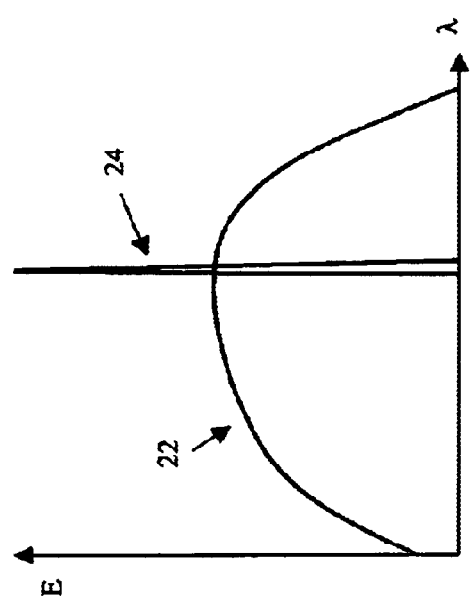
Figure 2:
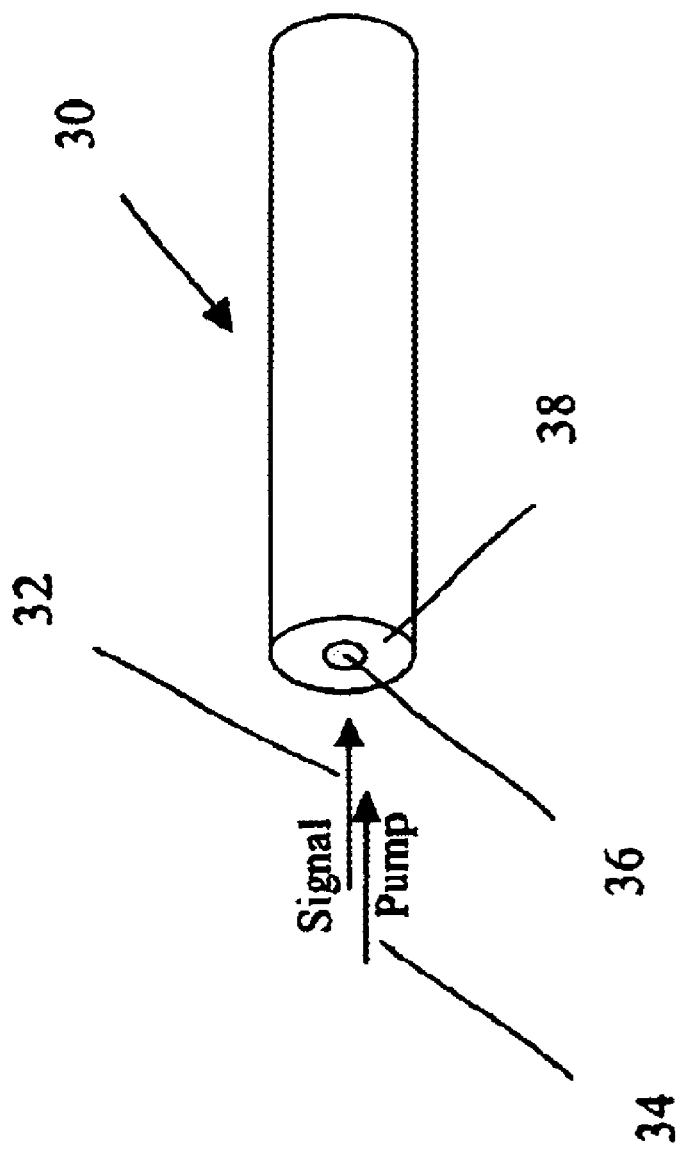
FIG. 2, as described above, is an illustration of a conventional fiber amplifier.
Figure 3:
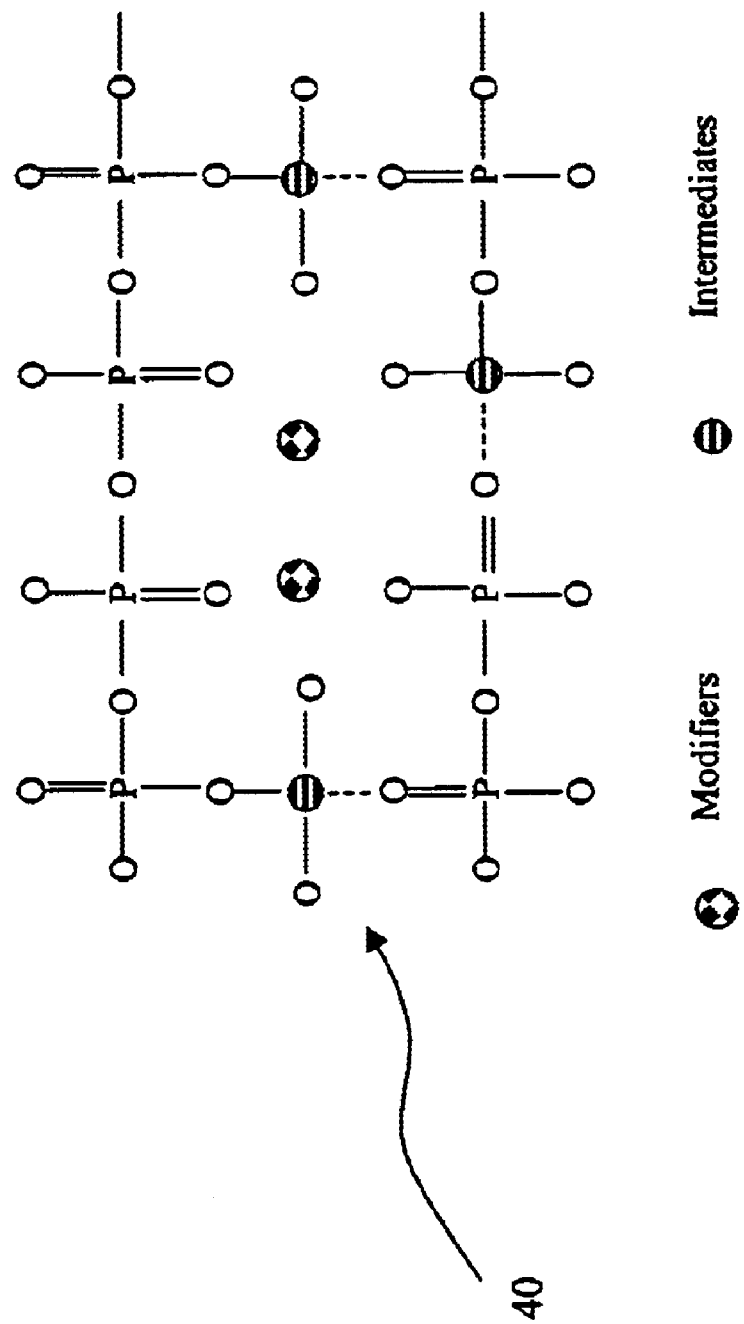
FIG. 3 is a diagram of an alkali-metal-free phosphate glass in accordance with the present invention.

As shown in FIG. 3, low temperature alkali-metal-free multi-component glasses as represented by phosphate glass 40 have a different bond structure than silica glass. In phosphate glass the basic unit of structure is the PO$_4$ tetrahedron. Because phosphate (P) is a pentavalent ion, one oxygen from each tetrahedron remains non-bridging to satisfy charge neutrality of the tetrahedron. Therefore, the connections of PO$_4$ tetrahedrons are made only at three corners. In this respect, phosphate glass differs from silica-based glasses. Due to the large amount of the non-bridging oxygen, the softening temperature of phosphate glasses is typically lower than silicate glasses. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

The glass compositions of the present invention are designed according to the following prescription: the relative amounts of the different glass components are given in mol. %. These units are preferred to wt. % because the relative amount of a given component given in mol. % is independent of the nature of the other components. When the units in wt. % are used, the relative amount of a given glass component will depend on the molecular weight of some of the other components.

The ultra-short highly absorbing fibers utilize a subclass of multi-component glasses that comprises a phosphate network former (P$_2$O$_5$) of 50 to 75 mole percent. Below 50 mol. % the glass becomes unstable and above 75 mol. % the glass is difficult to melt due to the severe vaporization of phosphate during the glass melting process. The glass comprises a network intermediator XO of 5 to 15 mole percent selected from PbO, ZnO, $WO_3$, $Y_2O_3$, $Al_2O_3$, $B_2O_3$ and mixtures thereof. The intermediator content has to be high enough to ensure high mechanical strength and good chemical durability and no so high as to cause the glass to devitrify. The glass further comprises a network modifier MO of 18 to 41 mole percent selected from alkaline-earth oxides and transition metal oxides such as BaO, BeO, MgO, SrO, CaO, ZnO, PbO and mixtures thereof. Lastly, the glass includes a rare earth dopant $La_2O_3$ of 4 to 10 mole percent. $La_2O_3$ will be replaced with $Er_2O_3$, $Yb_2O_3$ and other rare-earth oxides and mixtures thereof in active glasses for fiber amplifiers. $La_2O_3$, $Er_2O_3$, $Yb_2O_3$ and other rare-earth ions exhibit very similar chemical and physical properties while $La_2O_3$ has no absorption band from UV to NIR. Thus, $La_2O_3$ is a good substitute for other rare-earth ions in glasses to ensure that the properties of glasses with different doping concentrations are similar.

The glass composition is "alkali-metal-free" avoiding network modifiers $R_2O$ selected from alkali metal oxides such as $K_2O$, $Na_2O$, $Li_2O$, and $Rb_2O$, which tend to weaken the mechanical strength and reduce the chemical durability of the glass. Alkali-metal-free phosphate glasses will typically exhibit a small but often non-negligible dn/dT. To ensure dn/dT is close to zero, the mixture of network modifiers such as BaO and/or ZnO is adjusted.

For a given glass composition, the temperature coefficient of refractive index is calculated according to the following formula:

$$\beta = \frac{\sum_{i=1}^{N} \beta_i P_i}{\sum_{i=1}^{N} P_i} \text{ with } \sum_{i=1}^{N} P_i = 100 \quad (5)$$

where $\beta_i$ is the temperature coefficient of refractive index of the component i that is mixed in the glass at a relative amount $P_i$ given in mole percent. The glass has N different components.

The components for the glasses of the present invention can be classified into three categories: the glass forming and glass intermediators category, the glass modifier category, and the dopant category. In one example, the glass forming and intermediator category is composed of mixtures of $P_2O_5$, $Al_2O_5$, and $B_2O_3$. The temperature coefficient of refractive index for $P_2O_5$ is calculated according to the following formula:

$$\beta_{P_2O_5} = -11 + [0.16 \times (P_{P_2O_5} + P_{Al_2O_5} + P_{B_2O_3})] \quad (6)$$

here all the values for $\beta$ are given in units of $10^{-6}$ $K^{-1}$. Eq. (6) shows that when the components $P_2O_5$, $Al_2O_5$, and $B_2O_3$ are mixed in a phosphate glass with a total amount of 68.75 mol. %, approximately 60 mol. % of $P_2O_5$ and 8.75 mol. % of $Al_2O_5$ and $B_2O_3$, the resulting contribution of $P_2O_5$ to the overall temperature coefficient of refractive index is zero.

In this case, the overall $\beta$ for the glass can be adjusted through the choice of components of the modifier and dopant categories and calculated according to Eq. (5). Components from the dopant category include $La_2O_3$, $Er_2O_3$ and $Yb_2O_3$. These components all have similar properties and similar large positive values for $\beta$ ($15 \times 10^{-6}$ $K^{-1}$). Therefore, the relative amount of dopant is kept constant at around 8 mol. %. Finally, the remaining components are chosen from the modifier category. These include BaO and SrO that have negative $\beta$ and CaO, MgO, and ZnO that all have various positive values for $\beta$. The modifiers are added so that $\beta$ is close to zero, e.g. suitably from $-2.0 \times 10^{-6}$ to $+2.0 \times 10^{-6}$ $K^{-1}$ and preferably $-1.0 \times 10^{-6}$ to $+1.0 \times 10^{-6}$ $K^{-1}$. BaO exhibits a negative $\beta$ and a good glass forming capability in phosphate glasses. As such BaO is suitably the primary modifier.

Calculations predict and experimental data has verified that a phosphate glass composition suitable for use in a compact fiber amplifier and exhibiting a $\beta$ close to zero comprises:

50 to 75 mole % $P_2O_5$ as the glass network former;

5 to 15 mole % network intermediator XO selected from PbO, ZnO, $WO_3$, $Y_2O_3$, $Al_2O_3$, $B_2O_3$ and mixtures thereof;

3 to 10 mole % rare earth dopant selected from $La_2O_3$, $Er_2O_3$, $Yb_2O_3$ and mixtures thereof;

18 to 41 mole % modifier MO selected from BaO, BeO, MgO, SrO, CaO, ZnO, PbO and mixtures thereof; and is free of alkali metal oxides $R_2O$ selected from $Li_2O$, $K_2O$, $Na_2O$, $Rb_2O$, and mixtures thereof.

Table 1 lists glass compositions in mole % of phosphate glasses designed and fabricated and their temperature coefficients of refractive index.

TABLE 1

| $P_2O_5$ | $Al_2O_3$ | BaO | CaO | MgO | ZnO | $La_2O_3$ | $B_2O_3$ | $(10^{-6} K^{-1})$ dn/dT |
|---|---|---|---|---|---|---|---|---|
| 50 | 5 | 25 | 0 | 0 | 12 | 8 | 0 | −0.25 |
| 50 | 5 | 22.5 | 1 | 5.5 | 8 | 8 | 0 | 0.025 |
| 50 | 5 | 22.5 | 0 | 8.5 | 6 | 8 | 0 | −0.055 |
| 50 | 5 | 22.5 | 3.5 | 3 | 12 | 4 | 0 | 0.025 |
| 50 | 5 | 22.5 | 2.5 | 6 | 10 | 4 | 0 | −0.055 |
| 50 | 5 | 22.5 | 0.5 | 10 | 8 | 4 | 0 | −0.055 |
| 50 | 5 | 20 | 9 | 0 | 8 | 8 | 0 | 0.06 |
| 50 | 5 | 20 | 7 | 4 | 6 | 8 | 0 | 0.06 |
| 50 | 5 | 20 | 5 | 8 | 4 | 8 | 0 | 0.06 |
| 50 | 5 | 20 | 3 | 12 | 2 | 8 | 0 | 0.06 |
| 50 | 5 | 17.5 | 13 | 2.5 | 4 | 8 | 0 | 0.095 |
| 50 | 5 | 17.5 | 11.5 | 6 | 2 | 8 | 0 | 0.055 |
| 50 | 5 | 17.5 | 9.5 | 10 | 0 | 8 | 0 | 0.055 |
| 50 | 5 | 15 | 20 | 0 | 2 | 8 | 0 | 0.05 |
| 50 | 5 | 15 | 20 | 2 | 4 | 4 | 0 | 0.09 |
| 50 | 5 | 15 | 22 | 0 | 4 | 4 | 0 | −0.07 |
| 50 | 5 | 15 | 18 | 6 | 2 | 4 | 0 | 0.09 |
| 50 | 5 | 15 | 20 | 4 | 2 | 4 | 0 | −0.07 |
| 50 | 5 | 15 | 20 | 8 | 0 | 4 | 0 | 0.01 |
| 50 | 5 | 12.5 | 20.5 | 0 | 0 | 8 | 0 | 0.045 |
| 50 | 7.5 | 25 | 0 | 0 | 9.5 | 8 | 0 | −0.05 |
| 50 | 7.5 | 22.5 | 4 | 2 | 6 | 8 | 0 | 0.025 |
| 50 | 7.5 | 22.5 | 2 | 6 | 4 | 8 | 0 | 0.025 |
| 50 | 7.5 | 22.5 | 0 | 10 | 2 | 8 | 0 | 0.025 |
| 50 | 7.5 | 20 | 10.5 | 0 | 4 | 8 | 0 | 0.02 |
| 50 | 7.5 | 20 | 8.5 | 4 | 2 | 8 | 0 | 0.02 |
| 50 | 7.5 | 20 | 6.5 | 8 | 0 | 8 | 0 | 0.02 |
| 50 | 7.5 | 17.5 | 15 | 2 | 0 | 8 | 0 | 0.015 |
| 50 | 10 | 25 | 0 | 1 | 6 | 8 | 0 | 0.07 |
| 50 | 10 | 22.5 | 5.5 | 2 | 2 | 8 | 0 | −0.015 |
| 50 | 10 | 22.5 | 3.5 | 6 | 0 | 8 | 0 | −0.015 |
| 50 | 10 | 20 | 12 | 0 | 0 | 8 | 0 | −0.02 |
| 50 | 12.5 | 25 | 1 | 1.5 | 2 | 8 | 0 | 0.07 |
| 50 | 12.5 | 25 | 2.5 | 0 | 2 | 8 | 0 | −0.05 |
| 50 | 12.5 | 25 | 0.5 | 4 | 0 | 8 | 0 | −0.05 |
| 50 | 15 | 25 | 4 | 2 | 0 | 4 | 0 | −0.05 |
| 52 | 5 | 22.5 | 2.5 | 0 | 10 | 8 | 0 | −0.0526 |
| 52 | 5 | 22.5 | 0 | 4.5 | 8 | 8 | 0 | −0.0126 |
| 52 | 5 | 20 | 7 | 2 | 6 | 8 | 0 | −0.0576 |
| 52 | 5 | 20 | 5 | 6 | 4 | 8 | 0 | −0.0576 |
| 52 | 5 | 20 | 3 | 10 | 2 | 8 | 0 | −0.0576 |
| 52 | 5 | 20 | 1 | 14 | 0 | 8 | 0 | −0.0576 |
| 52 | 7.5 | 22.5 | 2 | 2 | 6 | 8 | 0 | 0.0754 |
| 52 | 7.5 | 22.5 | 0 | 6 | 4 | 8 | 0 | 0.0754 |
| 52 | 7.5 | 22.5 | 0 | 8 | 2 | 8 | 0 | −0.0846 |
| 52 | 7.5 | 20 | 8.5 | 0 | 4 | 8 | 0 | 0.0704 |
| 52 | 7.5 | 20 | 6.5 | 4 | 2 | 8 | 0 | 0.0704 |
| 52 | 7.5 | 20 | 4.5 | 8 | 0 | 8 | 0 | 0.0704 |
| 52 | 7.5 | 20 | 6.5 | 6 | 0 | 8 | 0 | −0.0896 |
| 52 | 7.5 | 17.5 | 13 | 2 | 0 | 8 | 0 | 0.0654 |
| 52 | 7.5 | 17.5 | 15 | 0 | 0 | 8 | 0 | −0.0946 |
| 52 | 10 | 22.5 | 3.5 | 2 | 2 | 8 | 0 | 0.0434 |
| 52 | 10 | 22.5 | 3 | 4.5 | 0 | 8 | 0 | −0.0766 |
| 52 | 10 | 20 | 10 | 0 | 0 | 8 | 0 | 0.0384 |
| 52 | 12.5 | 25 | 0 | 0 | 2.5 | 8 | 0 | 0.0964 |
| 52 | 12.5 | 22.5 | 7 | 0 | 2 | 4 | 0 | 0.0514 |

TABLE 1-continued

| $P_2O_5$ | $Al_2O_3$ | BaO | CaO | MgO | ZnO | $La_2O_3$ | $B_2O_3$ | dn/dT ($10^{-6}$ K$^{-1}$) |
|---|---|---|---|---|---|---|---|---|
| 52 | 12.5 | 22.5 | 5 | 4 | 0 | 4 | 0 | 0.0514 |
| 52 | 15 | 25 | 2 | 2 | 0 | 4 | 0 | 0.0244 |
| 55 | 0 | 20 | 5 | 0 | 2 | 8 | 10 | −0.03 |
| 55 | 5 | 22.50 | 0 | 0 | 9.5 | 8 | 0 | −0.045 |
| 55 | 5 | 20 | 4 | 2 | 6 | 8 | 0 | 0.03 |
| 55 | 5 | 20 | 2 | 6 | 4 | 8 | 0 | 0.03 |
| 55 | 5 | 20 | 0 | 10 | 2 | 8 | 0 | 0.03 |
| 55 | 5 | 17.5 | 8.5 | 4 | 2 | 8 | 0 | 0.025 |
| 55 | 5 | 17.5 | 6.5 | 8 | 0 | 8 | 0 | 0.025 |
| 55 | 5 | 15 | 15 | 2 | 0 | 8 | 0 | 0.02 |
| 55 | 5 | 15 | 17 | 0 | 0 | 8 | 0 | −0.14 |
| 55 | 5 | 22.5 | 0.5 | 0 | 4 | 8 | 5 | 0.065 |
| 55 | 5 | 22.5 | 0 | 2.5 | 2 | 8 | 5 | −0.055 |
| 55 | 10 | 22.5 | 2.5 | 0 | 2 | 8 | 0 | −0.005 |
| 55 | 10 | 22.5 | 0.5 | 4 | 0 | 8 | 0 | −0.005 |
| 55 | 10 | 20 | 9 | 0 | 2 | 4 | 0 | 0.03 |
| 55 | 10 | 20 | 7 | 4 | 0 | 4 | 0 | 0.03 |
| 55 | 12.5 | 25 | 0 | 0 | 3.5 | 4 | 0 | −0.06 |
| 55 | 12.5 | 22.5 | 4 | 2 | 0 | 4 | 0 | 0.015 |
| 55 | 15 | 25 | 1 | 0 | 0 | 4 | 0 | 0.0000 |
| 60 | 5 | 20 | 1 | 0 | 6 | 8 | 0 | 0.08 |
| 60 | 5 | 20 | 0 | 3 | 4 | 8 | 0 | 0.0000 |
| 60 | 5 | 20 | 3 | 0 | 8 | 4 | 0 | −0.04 |
| 60 | 5 | 20 | 1 | 4 | 6 | 4 | 0 | −0.04 |
| 60 | 5 | 17.5 | 3.5 | 6 | 0 | 8 | 0 | 0.075 |
| 60 | 5 | 17.5 | 5.5 | 2 | 2 | 8 | 0 | 0.075 |
| 60 | 5 | 17.5 | 3.5 | 6 | 0 | 8 | 0 | 0.075 |
| 60 | 5 | 17.5 | 5.5 | 4 | 0 | 8 | 0 | −0.085 |
| 60 | 5 | 15 | 12 | 0 | 0 | 8 | 0 | 0.07 |
| 60 | 7.5 | 20 | 2.5 | 0 | 2 | 8 | 0 | 0.08 |
| 60 | 7.5 | 20 | 0.5 | 4 | 0 | 8 | 0 | 0.08 |
| 60 | 7.5 | 20 | 2.5 | 2 | 0 | 8 | 0 | −0.08 |
| 60 | 7.5 | 17.5 | 7 | 0 | 0 | 8 | 0 | 0.235 |
| 60 | 7.5 | 17.5 | 9 | 2 | 0 | 4 | 0 | −0.045 |
| 60 | 10 | 20 | 6 | 0 | 0 | 4 | 0 | −0.04 |
| 62 | 5 | 20 | 0 | 0 | 5 | 8 | 0 | 0.0264 |
| 62 | 5 | 17.5 | 3.5 | 4 | 0 | 8 | 0 | 0.0214 |
| 62 | 5 | 15 | 12 | 0 | 2 | 4 | 0 | 0.0564 |
| 62 | 5 | 15 | 10 | 4 | 0 | 4 | 0 | 0.0564 |
| 62 | 7.5 | 20 | 0 | 2.5 | 0 | 8 | 0 | 0.0744 |
| 62 | 7.5 | 20 | 1.5 | 1 | 0 | 8 | 0 | −0.0456 |
| 62 | 7.5 | 17.5 | 7 | 2 | 0 | 4 | 0 | 0.0694 |
| 62 | 7.5 | 17.5 | 9 | 0 | 0 | 4 | 0 | −0.0906 |
| 62 | 10 | 22 | 0 | 0 | 0 | 6 | 0 | −0.0776 |
| 62 | 12.5 | 23 | 0 | 0 | 0 | 2.5 | 0 | −0.0046 |
| 65 | 5 | 20 | 0 | 0 | 6 | 4 | 0 | −0.07 |
| 65 | 5 | 17.5 | 4.5 | 0 | 4 | 4 | 0 | 0.085 |
| 65 | 5 | 17.5 | 4.5 | 2 | 2 | 4 | 0 | −0.075 |
| 65 | 5 | 15 | 9 | 2 | 0 | 4 | 0 | 0.08 |
| 65 | 5 | 15 | 11 | 0 | 0 | 4 | 0 | −0.08 |
| 65 | 7.5 | 20 | 0 | 1.5 | 2 | 4 | 0 | 0.07 |
| 65 | 7.5 | 20 | 0 | 3.5 | 0 | 4 | 0 | −0.09 |
| 65 | 10 | 21.5 | 0 | 0 | 0 | 3.5 | 0 | −0.05 |
| 65 | 11.5 | 22 | 0 | 0 | 0 | 1.5 | 0 | 0.031 |
| 68 | 5 | 17.5 | 1.5 | 0 | 0 | 8 | 0 | 0.0974 |
| 68 | 5 | 17.5 | 3.5 | 0 | 2 | 4 | 0 | −0.0226 |
| 68 | 5 | 17.5 | 1.5 | 4 | 0 | 4 | 0 | −0.0226 |
| 70 | 5 | 17.5 | 1.5 | 2 | 0 | 4 | 0 | −0.025 |
| 75 | 5 | 18 | 0 | 0 | 0 | 2 | 0 | −0.05 |

The currently preferred glass composition comprises:
  Approximately 58–65 mole % of network former $P_2O_5$;
  Approximately 8–12 mole % of intermediator XO selected from $Al_2O_3$, $B_2O_3$ and mixtures thereof;
  Approximately 3–8 mole % rare earth dopants selected from $La_2O_3$, $Er_2O_3$, $Yb_2O_3$ and mixtures thereof;
  Approximately 20–24 mole % modifier MO of which BaO is the primary modifier; and
  is free of any alkali metal oxides.

Glasses containing $Al_2O_3$ are typically slightly stronger than other glasses. In addition, high purity $Al_2O_3$ with low water content is easily achieved. Bao has a good glass forming capability in phosphate glasses and exhibits a negative dn/dT. Because the glass is alkali-metal-free, the composition of the phosphate network former, $Al_2O_3$ intermediator and rare earth dopants together provide a β that is positive. The amount of modifier, primarily BaO, is adjusted to offset this positive β.

A fist alternate glass composition comprises:
  Approximately 50–58 mole % $P_2O_5$;
  Approximately 5–15 mole % network intermediator XO selected from PbO, ZnO, $WO_3$, $Y_2O_3$, $Al_2O_3$, $B_2O_3$ and mixtures thereof;
  Approximately 3–9 mole % rare earth dopants selected from $La_2O_3$, $Er_2O_3$, $Yb_2O_3$ and mixtures thereof;
  Approximately 20–41 mole % network modifier MO selected from BaO, BeO, MgO, SrO, CaO, ZnO, PbO and mixtures thereof; and
  is free of any alkali metal oxides.

A second alternate glass composition comprises:
  Approximately 58–65 mole % $P_2O_5$;
  Approximately 5–15 mole % network intermediator XO selected from PbO, ZnO, $WO_3$, $Y_2O_3$, $Al_2O_3$, $B_2O_3$ and mixtures thereof;
  Approximately 3–9 mole % rare earth dopants selected from $La_2O_3$, $Er_2O_3$, $Yb_2O_3$ and mixtures thereof;
  Approximately 18–35 mole % network modifier MO selected from BaO, BeO, MgO, SrO, CaO, ZnO, PbO and mixtures thereof; and
  is free of any alkali metal oxides.

A third alternate glass composition comprises:
  Approximately 65–75 mole % $P_2O_5$;
  Approximately 5–15 mole % network intermediator XO selected from PbO, ZnO, $WO_3$, $Y_2O_3$, $Al_2O_3$, $B_2O_3$ and mixtures thereof;
  Approximately 3–9 mole % rare earth dopants selected from $La_2O_3$, $Er_2O_3$, $Yb_2O_3$ and mixtures thereof;
  Approximately 18–27 mole % network modifier MO selected from BaO, BeO, MgO, SrO, CaO, ZnO, PbO and mixtures thereof; and
  is free of any alkali metal oxides.

Fiber Drawing of Double-Clad Phosphate Fiber

Figure 4:
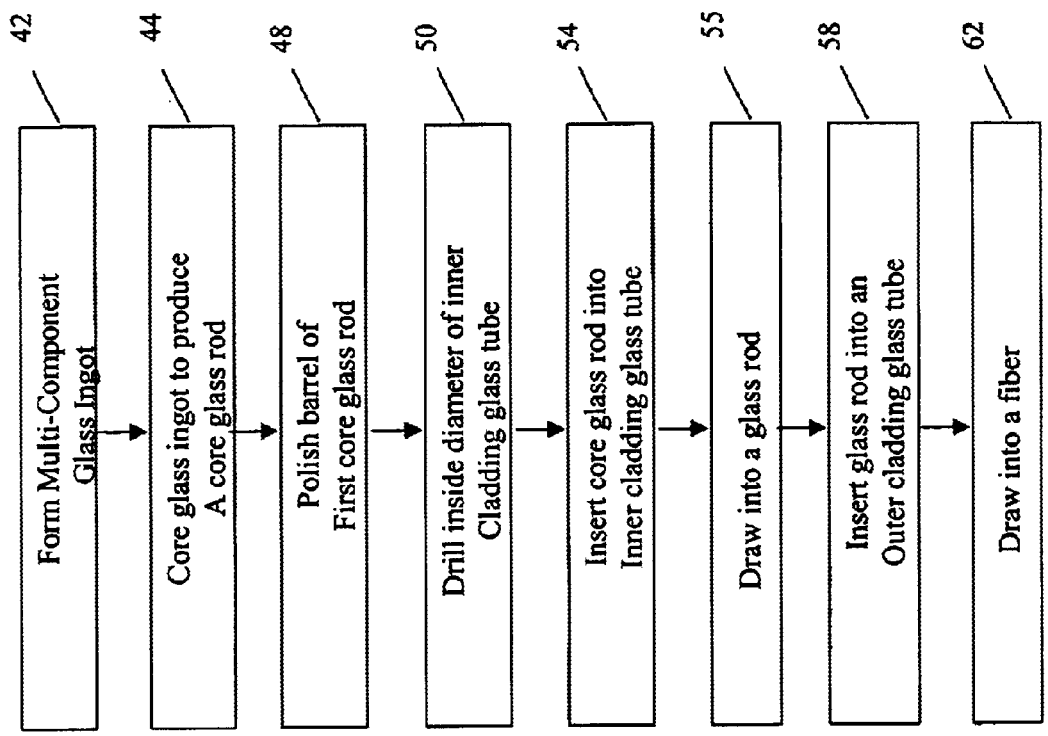
FIG. 4 is a flowchart showing the steps of manufacturing a phosphate glass preform and fiber in accordance with the present invention.
Figure 5:
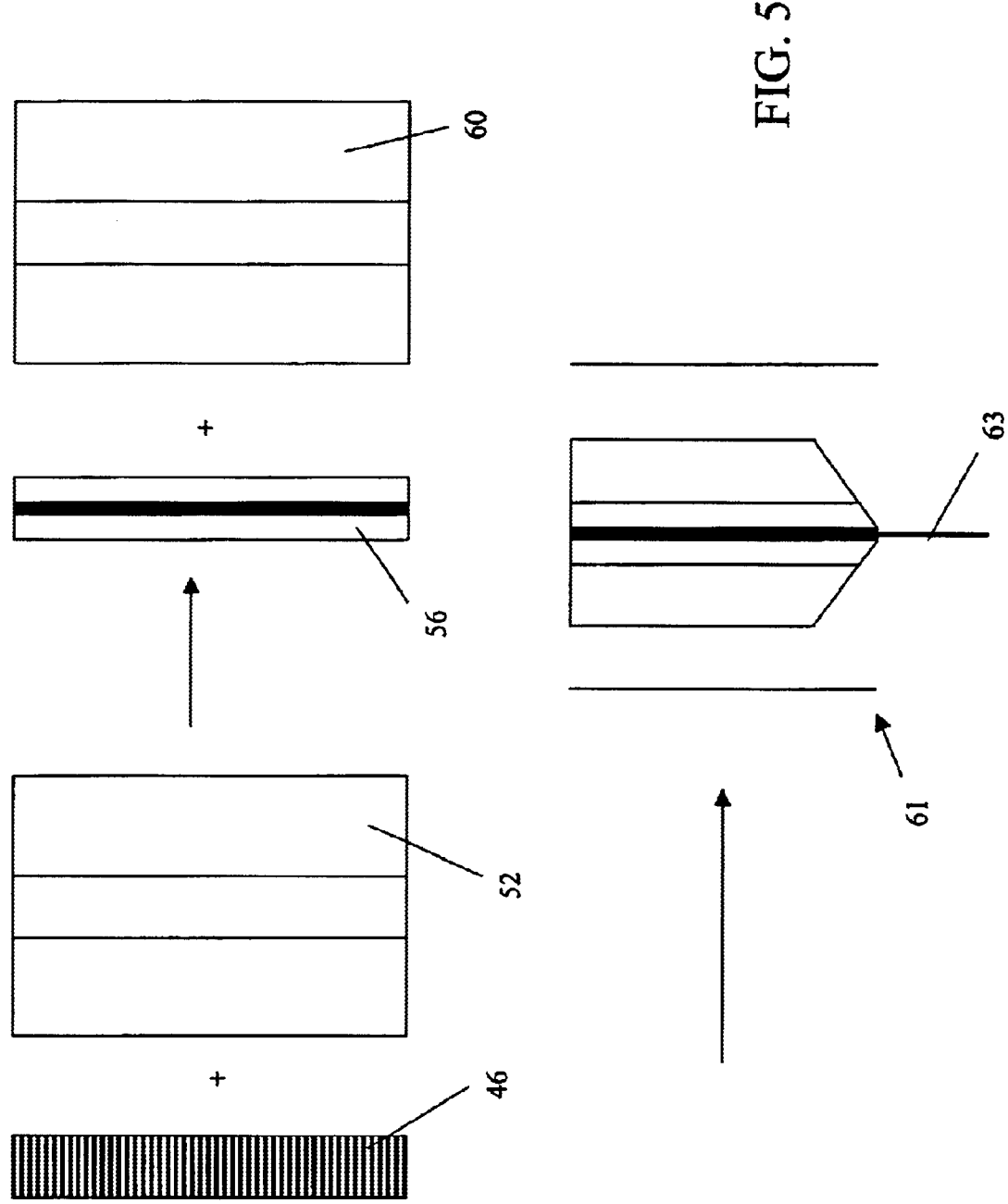
FIG. 5 is a diagram showing schematically the stages of manufacture for producing the phosphate glass fiber.

FIGS. 4 and 5 illustrate the steps of a rod-in-tube technique used to produce a glass preform and a double-clad micro fiber 63 from the alkali-metal-free phosphate glass composition of the present invention. A glass ingot (not shown) formed from a low-temperature phosphate glass possibly containing rare earth dopants ($La_2O_3$, $Er_2O_3$, $Yb_2O_3$) is formed in step 42. Once the ingot is formed, the ingot is cored to produce in step 44 a core glass rod 46. The barrel of the core glass rod 46 is polished in step 48. In step 50, an inner cladding glass tube 52 formed of a similar first multi-component glass but without dopants is drilled to have an inside diameter within 0.1 mm fluctuation of the outside diameter of the core glass rod. Both the inside and outside surfaces of the inner cladding glass tube are polished. In step 54, the core glass rod 46 is placed inside the inner cladding glass tube 52, and the assembly is drawn to form a glass rod 56 (step 55). The glass rod 56 is placed, in step 58, inside an outer cladding glass tube 60 formed of a second multi-component glass (possibly silicate or phosphate) and the preform 61 is drawn in step 62 into a double-clad multi-component glass fiber 63. Fiber drawings were performed in an argon gas atmosphere to reduce absorption of water from air exposure, which causes fluorescence quenching of $Er^{3+}$ ions. The fiber drawing was performed at 765° C. No plastic coating was applied to the fiber.

In one specific embodiment, a phosphate gain fiber is drawn for a multi-mode clad-pumped fiber amplifier to exhibits dn/dT close to zero and comprises:
  a cladding that includes
    63% by mole $P_2O_5$, 8.5% by mole $Al_2O_3$, 20.5% by mole BaO, 3.0% by mole $B_2O_3$, 2.0% by mole MgO, and 3.0% by mole $La_2O_3$; and a core that includes 60.8% by mole $P_2O_5$, 8.2% by mole $Al_2O_3$, 22.7% by mole BaO, 1.9% by mole ZnO, 1.1% by mole $Er_2O_3$, and 5.3% by mole $Yb_2O_3$.

More generally, gain fibers of the type used in an erbium micro fiber amplifier (EMFA) of the type illustrated in FIGS. 6a–6d have a core that comprises Erbium 0.2 to 2 mole percent, preferably 0.8 mole % or greater, and Ytterbium 2 to 12 mole percent, with a total doping concentration preferably greater than 4 mole percent. In an alternate embodiment the glass is co-doped with Erbium 0.8 to 2 mole percent and Ytterbium 4.5 to 12 mole percent, with a total doping concentration preferably greater than 6 mole percent.

Erbium Micro Fiber Amplifier (EMFA)

A compact EMFA 64 is, in general, formed by replacing the meters of coiled silica fiber in a typical EDFA with a micro fiber 66 less than 20 cm in length, typically 2–10 cm, formed of a phosphate glass co-doped with 0.2–2 mole % erbium and 2 to 12 mole % ytterbium and replacing the single-mode pump with an inexpensive multi-mode pump 68. Multi-mode pump lasers output multiple spatial modes from either a single broad emitting area or an array of single transverse mode lasers. In both cases, different modes have different phase and propagation directions, which makes focusing more difficult than with single mode lasers. Single and double-pass EMFAs are depicted in FIGS. 6a through 6d with different pump coupling configurations. Other passive components such as taps, detectors and gain flattening filters are not shown.

As shown in FIG. 6a, single-pass EMFA 64 includes a micro fiber 66 that is fusion spliced at splices 70 and 72 between sections of passive double-clad fiber 74 and 76, respectively. Multi-mode pump 68, in a hermetically sealed package, directs pump light into a TIR coupler 77, which couples the light into the fiber's inner cladding 78 where it is confined by an outer cladding 80, air or some other lower index material as shown in a exploded section view of the micro fiber. As the multi-mode pump propagates down the fiber, the pump light is coupled into and partially absorbed in core 82 thereby pumping the active material in the fiber core and amplifying optical signal 84 passing therethrough. A variety of pump coupling and recycling schemes can be adopted to optimize gain, noise figure, form factor, power consumption or cost. For example, a grating may be written on or a prism mounted on the inner cladding of double-clad fiber 76 to reflect and further mode couple the pump radiation.

FIG. 6b illustrates a free-space single-pass EMFA 64, in which micro fiber 66 and multi-mode pump 68 (chip-on-submount) are arranged in an inline extended butterfly hermetic package 86. Optical signal 84 is brought in from a conventional single-mode fiber (SMF) 85 via fiber port 88 and a coupling optic 90, which collimates the signal beam. Pump coupler 92 free-space couples the optical signal and pump into the fiber core and fiber cladding, respectively. The pump is coupled into the fiber core where it inverts the active material such that the optical signal is amplified as it propagates therethrough. The amplified signal is output coupled via coupling optic 94 through fiber port 96 to a conventional SMF 98. One advantage of the free-space approach is that the passive components can be discrete and simply dropped into the signal path.

Figure 6C:
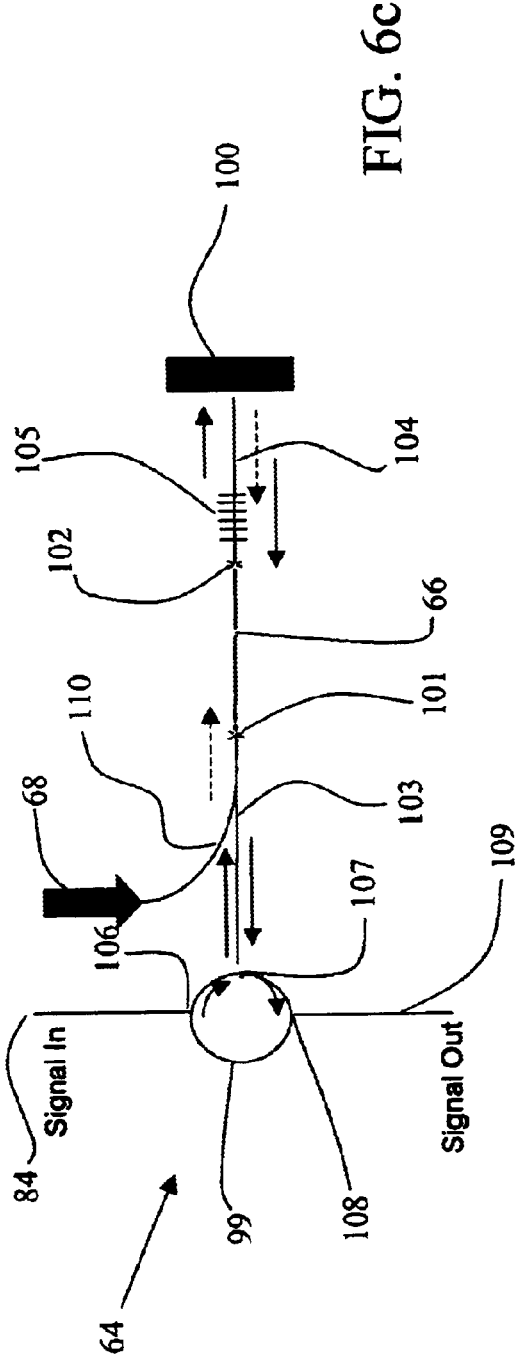

As shown in FIG. 6c, a double-pass EMFA 64 includes an optical circulator 99 and a reflector 100 (broadband or wavelength selective) that are placed at each end of micro fiber 66 to give double-pass amplification to input optical signals 84. As depicted in this particular embodiment, micro fiber 66 is fusion spliced at splices 101 and 102 between sections of passive double-clad fiber 103 and 104. A gain flattening filter 105 is written on double clad fiber 104 to flatten the gain spectra. Optical circulator 99 has an input port 106 for receiving input optical signal 84, an I/O port 107 for coupling signal 84 to and from micro fiber 66, and an output port 108 for producing the amplified optical signal 109. Multi-mode pump 68 couples pump light into the fiber's inner cladding via a fused fiber coupler 110 or, as described below, a TIR coupler where the pump is confined by an outer cladding, air or some other lower index material. As it propagates down the fiber, the pump is coupled into and partially absorbed in the fiber core thereby pumping the active material in the fiber core and amplifying the optical signal. A variety of pump coupling and recycling schemes can be adopted to optimize gain, noise figure, form factor, power consumption or cost. For example, broadband reflector 100 can be formed at an angle or with a curvature to further enhance mode coupling of the reflected pump.

Figure 6D:
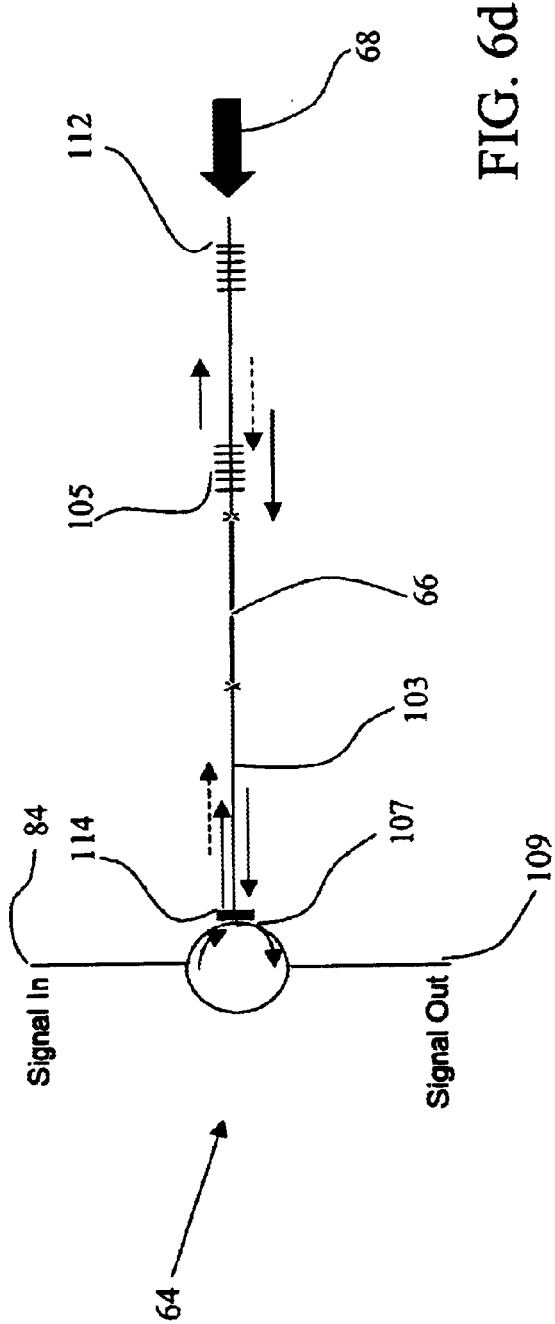

As shown in FIG. 6d, the double-pass EMFA 64 is configured such that the multi-mode pump is coupled into the open-end of the amplifier. Broadband reflector 100 is replaced by a wavelength selective filter 112 such as a grating written on SMF that reflects light at the signal wavelength but transmits light at the pump wavelength. Multi-mode pump 68 directs pump light into the cladding of the SMF fiber. The pump light propagates through gain flattening filter 105 and inverts micro fiber 66 thereby providing amplification for optical signal 84. To reduce noise figure to an acceptable level the pump must be recycled. Pump recycler 114 such as a surface coated with a wavelength selective material at or near the I/O port 107 of the circulator or a grating written into the inner cladding of SMF 103 will serve to reflect the pump and pass amplified signal 109.

Efficient coupling of the multi-mode pump into the inner cladding of the fiber is the first step in obtaining high overall pump absorption efficiencies. Fused fiber couplers are one approach that yields coupling efficiencies of approximately 50%. As described in co-pending U.S. patent application Ser. No. 09/943,257 entitled "Total Internal Reflection (TIR) Coupler and Method for Side-Coupling Pump Light into a Fiber", which is hereby incorporated by reference, coupling efficiencies approaching 90% are achieved by bonding a TIR coupler (element 77 in FIG. 6a above) in optical contact with the fiber's inner cladding; either the micro fiber itself or the passive double-clad fiber. The TIR coupler has an angle of taper and a length such that the principal ray of the pump light is reflected at an angle that satisfies the total internal reflection condition at the coupler's reflecting surface, and input and output coupling conditions, to efficiently "fold" the light into the fiber and satisfies the TIR condition inside the fiber to "guide" the light down the fiber's inner cladding. The angle of incidence is preferably such that substantially all of the pump light (principal and marginal rays) satisfies the TIR condition.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A phosphate glass composition comprising the following ingredients, a glass network former $P_2O_5$ in mole percent $P_1$ from 50 to 75 percent and having a temperature coefficient of refractive index $\beta_1$, A glass intermediator XO selected from the oxide group consisting of $Al_2O_3$, $B_2O_3$, $Y_2O_3$, $La_2O_3$, and mixtures thereof in mole percent $P_2$ from 5 to 15 percent and having a temperature coefficient of refractive index $\beta_2$, A rare earth dopant selected from $La_2O_3$, $Er_2O_3$, $Yb_2O_3$ and mixtures thereof in mole percent $P_3$ from 3 to 10 percent and having a temperature coefficient of refractive index $\beta_3$, and A glass modifier MO selected from BaO, BeO, MgO, SrO, CaO, ZnO, PbO and mixtures thereof in mole percent $P_4$ from 20 to 41 percent and having a temperature coefficient of refractive index $\beta_4$, Wherein the temperature coefficient of refractive index $\beta$ of the phosphate glass composition is give by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$.

2. A phosphate glass composition comprising the following ingredients, a glass network former $P_2O_5$ in mole percent $P_1$ from 50 to 75 percent and having a temperature coefficient of refractive index $\beta_1$, A glass intermediator XO selected from the oxide group consisting of $Al_2O_3$, $B_2O_3$, $Y_2O_3$, $La_2O_3$, and mixtures thereof in mole percent $P_2$ from 5 to 15 percent and having temperature coefficient of refractive index $\beta_2$, A rare earth dopant selected from $La_2O_3$, $Er_2O_3$, $Yb_2O_3$ and mixtures thereof in mole percent $P_3$ from 3 to 10 percent and having a temperature coefficient of refractive index $\beta_3$, and A glass modifier MO selected from BaO, BeO, MgO, SrO, CaO, ZnO, PbO and mixtures thereof in mole percent $P_4$ from 18 to 41 percent and having a temperature coefficient of refractive index $\beta_4$, Wherein the temperature coefficient of refractive index $\beta$ of the phosphate glass composition is give by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$, and
wherein the glass composition is free of alkali metal oxides $R_2O$ selected from $Li_2O$, $K_2O$, $Na_2O$, $Rb_2O$, and mixtures thereof.

3. The phosphate glass composition of claim 1, wherein $\beta$ lies between $-1.0 \times 10^{-6}$ to $1.0 \times 10^{-6}$ $K^{-1}$.

4. The phosphate glass composition of claim 1, wherein the mole percent $P_1$ of $P_2O_5$ is approximately 58–65, the glass intermediator XO comprises a mixture of $B_2O_3$ and $Al_2O_3$ with $P_2$ of approximately 8–12 mole percent and the rare earth dopant $P_3$ is approximately 3–8 mole percent.

5. A phosphate glass composition comprising the following ingredients, a glass network former $P_2O_5$ in mole percent $P_1$ from 58 to 65 percent and having a temperature coefficient of refractive index $\beta_1$, A glass intermediator XO comprises a mixture of $B_2O_3$ and $Al_2O_3$ in mole percent $P_2$ from 8 to 12 percent and having a temperature coefficient of refractive index $\beta_2$, A rare earth dopant selected from $La_2O_3$, $Er_2O_3$, $Yb_2O_3$ and mixtures thereof in mole percent $P_3$ from 3 to 8 percent and having a temperature coefficient of refractive index $\beta_3$, and A glass modifier MO selected from BaO, BeO, MgO, SrO, CaO, ZnO, PbO and mixtures thereof in mole percent $P_4$ from 18 to 41 percent, primarily comprising BaO of 20–24 mole percent, said glass modifier MO having a temperature coefficient of refractive index $\beta_4$, Wherein the temperature coefficient of refractive index $\beta$ of the phosphate glass composition is given by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$.

6. The phosphate glass composition of claim 4, wherein the rare earth dopant $P_3$ is approximately 8 mole percent.

7. A phosphate glass composition comprising the following ingredients, a glass network former $P_2O_5$ in mole percent $P_1$ is approximately 50–58 and having a temperature coefficient of refractive index $\beta_1$, A glass intermediator XO selected from the oxide group consisting of $Al_2O_3$, $B_2O_3$, $Y_2O_3$, $La_2O_3$, and mixtures thereof in mole percent $P_2$ is 5–15 and having a temperature coefficient of refractive index $\beta_2$, A rare earth dopant selected from $La_2O_3$, $Er_2O_3$, $Yb_2O_3$ and mixtures thereof in mole percent $P_3$ is 3–9 and having a temperature coefficient of refractive index $\beta_3$, and A glass modifier MO selected from BaO, BeO, MgO, SrO, CaO, ZnO, PbO and mixtures thereof in mole percent $P_4$ is 20–41 and having a temperature coefficient of refractive index $\beta_4$, Wherein the temperature coefficient of refractive index $\beta$ of the phosphate glass composition is give by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$.

8. The phosphate glass composition of claim 1, wherein the mole percent $P_1$ of $P_2O_5$ is approximately 58–65, the mole percent $P_2$ of intermediator XO is 5–15, the mole percent $P_3$ of rare earth dopant is 3–9, and the mole percent of modifiers MO is 20–35.

9. The phosphate glass composition of claim 1, wherein the mole percent $P_1$ of $P_2O_5$ is approximately 65–75, the mole percent $P_2$ of intermediator XO is 5–15, the mole percent $P_3$ of rare earth dopant is 3–9, and the mole percent of modifiers MO is 20–28.

10. A phosphate glass composition comprising the following ingredients,
   a glass network former $P_2O_5$ in mole percent $P_1$ from 50 to 75 percent and having a temperature coefficient of refractive index $\beta_1$,
   A glass intermediator XO selected from the oxide group consisting of $Al_2O_3$, $B_2O_3$, $Y_2O_3$, $La_2O_3$, and mixtures hereof in mole percent $P_2$ from 5 to 15 percent and having temperature coefficient of refractive index $\beta_2$,
   A rare earth dopant comprising $Er_2O_3$ of 0.2 t 2 mole percent and $Yb_2O_3$ of 2 to 12 mole percent and having a temperature coefficient of refractive index $\beta_3$, and
   A glass modifier MO selected from BaO, BeO, MgO, SrO, CaO, ZnO, PbO and mixtures thereof in mole percent $P_4$ from 18 to 41 percent and having a temperature coefficient of refractive index $\beta_4$,
   Wherein the temperature coefficient of refractive index $\beta$ of the phosphate glass composition is given by, $$\beta = \frac{\sum_{i=1}^{N} \beta_i P_i}{\sum_{i=1}^{N} P_i} \text{ with } \sum_{i=1}^{N} P_i = 100.$$

11. A phosphate glass composition comprising the following ingredients,
   a glass network former $P_2O_5$ in mole percent $P_1$ from 58 to 65 percent and having a temperature coefficient of coefficient refractive index $\beta_1$,
   A glass intermediator XO selected from the oxide group consisting of $Al_2O_3$, $B_2O_3$ and mixtures thereof in mole percent $P_2$ from 8 to 12 percent and having a temperature coefficient of refractive index $\beta_2$,
   A rare earth dopant selected from $La_2O_3$, $Er_2O_3$, $Yb_2O_3$ and mixtures thereof in mole percent $P_3$ from 3 to 8 percent and having a temperature coefficient of refractive index $\beta_3$, and
   A glass modifier MO selected from BaO, BeO, MgO, SrO, CaO, ZnO, PbO and mixtures thereof in mole percent $P_4$ from 20 to 24 percent in which BaO is the primary modifier and having a temperature coefficient of refractive index $\beta_4$,
   Wherein the temperature coefficient of refractive index $\beta$ of the phosphate glass composition is given by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$, and
   Wherein the glass composition is substantially free of alkali metal oxides $R_2O$ selected from $Li_2O$, $K_2O$, $Na_2O$, $Rb_2O$, and mixtures thereof.

12. The phosphate glass composition of claim 11, wherein $\beta$ lies between $-1.0 \times 10^{-6}$ to $1.0 \times 10^{-6}$ $K^{-1}$.

13. The phosphate glass composition of claim 11, wherein the rare earth dopant $P_3$ is approximately 8 mole percent.

14. The phosphate glass composition of claim 11, wherein the rare earth dopant comprises erbium of 0.2 to 2 mole percent and ytterbium of 2 to 12.

15. An optical fiber amplifier, comprising:
   A fiber having a core and an inner cladding of similar multi-component glass compositions each comprising,
   A glass network former $P_2O_5$ in mole percent $P_1$ from 50 to 75 percent and having a temperature coefficient of refractive index $\beta_1$,
   A glass intermediator XO selected from the oxide group consisting of $Al_2O_3$, $B_2O_3$, $Y_2O_3$, $La_2O_3$, and mixtures thereof in mole percent $P_2$ from 5 to 15 percent an having a temperature coefficient of refractive index $\beta_2$,
   A rare earth dopant selected from $La_2O_3$, $Er_2O_3$, $Yb_2O_3$ and mixtures thereof in mole percent $P_3$ from 3 to 10 percent and having a temperature coefficient of refractive index $\beta_3$, and
   A glass modifier MO selected from BaO, BeO, MgO, SrO, CaO, ZnO, PbO and mixtures thereof in mole percent $P_4$ from 20 to 41 percent and having a temperature coefficient of refractive index $\beta_4$,
   Wherein the temperature coefficient of refractive index $\beta$ of the phosphate glass composition is given by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$, and
   A pump laser that emits pump radiation that is coupled into and partially absorbed by the doped core causing stimulated emission and amplification of an optical signal passing therethrough.

16. The optical fiber amplifier of claim 15, wherein the pump laser comprises a multi-mode pump that emits pump radiation that is coupled into the fiber's inner cladding and partially absorbed by the doped core.

17. An optical fiber amplifier, comprising:
   A fiber 2–10 cm in length, said fiber having a core and an inner cladding of similar multi-component glass compositions each comprising,
   A glass network former $P_2O_5$ in mole percent $P_1$ from 50 to 75 percent and having a temperature coefficient of refractive index $\beta_1$,
   A glass intermediator XO selected from the oxide group consisting of $Al_2O_3$, $B_2O_3$, $Y_2O_3$, $La_2O_3$, and mixtures thereof in mole percent $P_2$ from 5 to 15 percent an having a temperature coefficient of refractive index $\beta_2$,
   A rare earth dopant selected from $La_2O_3$, $Er_2O_3$, $Yb_2O_3$ and mixtures thereof in mole percent $P_3$ from 3 to 10 percent and having a temperature coefficient of refractive index $\beta_3$, and
   A glass modifier MO selected from BaO, BeO, MgO, SrO, CaO, ZnO, PbO and mixtures thereof in mole percent $P_4$ from 18 to 41 percent and having a temperature coefficient of refractive index $\beta_4$,
   Wherein the temperature coefficient of refractive index $\beta$ of the phosphate glass composition is given by, $$\beta = \frac{\sum_{i=1}^{N} \beta_i P_i}{\sum_{i=1}^{N} P_i} \text{ with } \sum_{i=1}^{N} P_i = 100$$

and $\beta$ lies between $-2.0 \times 10^{-6}$ to $2.0 \times 10^{-6}$ $K^{-1}$, and
   A pump laser that emits pump radiation that is coupled into and partially absorbed by the doped core causing stimulated emission and amplification of an optical signal passing therethrough.

18. An optical fiber amplifier, comprising:

A fiber having a core and an inner cladding of similar multi-component glass compositions each comprising, A glass network former $P_2O_5$ in mole percent $P_1$ from 50 to 75 percent and having a temperature coefficient of refractive index $\beta_1$, A glass intermediator XO selected from the oxide group consisting of $Al_2O_3$, $B_2O_3$, $Y_2O_3$, $La_2O_3$, and mixtures thereof in mole percent $P_2$ from 5 to 15 percent and having a temperature coefficient of refractive index $\beta_2$, A rare earth dopant selected from $La_2O_3$, $Er_2O_3$, $Yb_2O_3$ and mixtures thereof in mole percent $P_3$ from 3 to 10 percent and having a temperature coefficient of refractive index $\beta_3$, wherein the inner cladding comprises the rare earth dopant $La_2O_3$ and the core is co-doped with 0.2 to 2 mole percent $Er_2O_3$ and 2 to 12 mole percent $Yb_2O_3$, and A glass modifier MO selected from BaO, BeO, MgO, SrO, CaO, ZnO, PbO and mixtures thereof in mole percent $P_4$ from 18 to 41 percent and having a temperature coefficient of refractive index $\beta_4$, Wherein the temperature coefficient of refractive index $\beta$ of the phosphate glass composition is given by, $$\beta = \frac{\sum_{i=1}^{N} \beta_i P_i}{\sum_{i=1}^{N} P_i} \quad \text{with} \quad \sum_{i=1}^{N} P_i = 100$$

and $\beta$ lies between $-2.0 \times 10^{-6}$ to $2.0 \times 10^{-6}$ $K^{-1}$, and A pump laser that emits pump radiation that is coupled into and partially absorbed by the doped core causing stimulated emission and amplification of an optical signal passing therethrough.

19. An optical fiber amplifier, comprising:

A fiber having a core and an inner cladding of similar multi-component glass compositions each comprising, A glass network former $P_2O_5$ in mole percent $P_1$ from 50 to 75 percent and having a temperature coefficient of refractive index $\beta_1$, A glass intermediator XO selected from the oxide group consisting of $Al_2O_3$, $B_2O_3$, $Y_2O_3$, $La_2O_3$, and mixtures thereof in mole percent $P_2$ from 5 to 15 percent and having a temperature coefficient of refractive index $\beta_2$, A rare earth dopant selected from $La_2O_3$, $Er_2O_3$, $Yb_2O_3$ and mixtures thereof in mole percent $P_3$ from to 10 percent and having a temperature coefficient of refractive index $\beta_3$, and A glass modifier MO selected from BaO, BeO, MgO, SrO, CaO, ZnO, PbO and mixtures thereof in mole percent $P_4$ from 18 to 41 percent and having a temperature coefficient of refractive index $\beta_4$, Wherein the temperature coefficient of refractive index $\beta$ of the phosphate glass composition is given by, $$\beta = \frac{\sum_{i=1}^{N} \beta_i P_i}{\sum_{i=1}^{N} P_i} \quad \text{with} \quad \sum_{i=1}^{N} P_i = 100$$

and $\beta$ lies between $-2.0 \times 10^{-6}$ to $2.0 \times 10^{-6}$ $K^{-1}$, and wherein the glass composition is free of alkali metal oxides $R_2O$ selected from $Li_2O$, $K_2O$, $Na_2O$, $Rb_2O$, and mixtures thereof, and A pump laser that emits pump radiation that is coupled into and partially absorbed by the doped core causing stimulated emission and amplification of an optical signal passing therethrough.

20. An optical fiber amplifier, comprising:

A fiber having a core and an inner cladding of similar multi-component glass compositions each comprising, A glass network former $P_2O_5$ in mole percent $P_1$ is approximately 58–65 percent and having a temperature coefficient of refractive index $\beta_1$, A glass intermediator XO comprises a mixture of $B_2O_3$ and $Al_2O_3$ with mole percent $P_2$ of approximately 8–12 mole percent and having a temperature coefficient of refractive index $\beta_2$, A rare earth dopant selected from $La_2O_3$, $Er_2O_3$, $Yb_2O_3$ and mixtures thereof in mole percent $P_3$ from approximately 3–8 mole percent and having a temperature coefficient of refractive index $\beta_3$, and A glass modifier MO selected from BaO, BeO, MgO, SrO, CaO, ZnO, PbO and mixtures thereof in mole percent $P_4$ is approximately 20–24 mole percent with the primary modifier being BaO and having a temperature coefficient of refractive index $\beta_4$, Wherein the temperature coefficient of refractive index $\beta$ of the phosphate glass composition is given by, $$\beta = \frac{\sum_{i=1}^{N} \beta_i P_i}{\sum_{i=1}^{N} P_i} \quad \text{with} \quad \sum_{i=1}^{N} P_i = 100$$

and $\beta$ lies between $-2.0 \times 10^{-6}$ to $2.0 \times 10^{-6}$ $K^{-1}$, and A pump laser that emits pump radiation that is coupled into and partially absorbed by the doped core causing stimulated emission and amplification of an optical signal passing therethrough.

21. A phosphate glass composition comprising the following ingredients,

A glass network former $P_2O_5$ in mole percent $P_1$ from 50 to 75 percent,

A glass intermediator XO selected from the oxide group consisting of $Al_2O_3$, $B_2O_3$, $Y_2O_3$, $La_2O_3$, and mixtures thereof in mole percent $_2$ from 5 to 15 percent, A rare earth dopant selected from $Er_2O_3$, $Yb_2O_3$, and mixtures thereof in mole percent $P_3$ from 3 to 10 percent, and A glass modifier MO selected from BaO, BeO, MgO, SrO, CaO, ZnO, PbO and mixtures thereof in mole percent $P_4$ from 20 to 41 percent, wherein the glass composition has a temperature coefficient of refractive index that lies between $-2.0 \times 10^{-6}$ to $2.0 \times 10^{-1}$ $K^{-1}$.

22. A phosphate glass composition comprising the following ingredients, a glass network former $P_2O_5$ in mole percent $P_1$ from 50 to 75 percent, A glass intermediator XO selected from the oxide group consisting of $Al_2O_3$, $B_2O_3$, $Y_2O_3$, $La_2O_3$, and mixtures thereof in mole percent $P_2$ from 5 to 15 percent, A rare earth dopant selected from $La_2O_3$, $Er_2O_3$, $Yb_2O_3$ and mixtures thereof in mole percent $P_3$ from 3 to 10 percent, and A glass modifier MO selected from BaO, BeO, MgO, SrO, CaO, ZnO, PbO and mixtures thereof in mole percent $P_4$ from 20 to 41 percent, wherein the glass composition is free of alkali metal oxides $R_2O$ selected from $Li_2O$, $K_2O$, $Na_2O$, $Rb_2O$, and mixtures thereof.

23. The phosphate glass composition of claim 22, wherein the glass composition has a temperature coefficient of refractive index that lies between $-2.0\times10^{-6}$ to $2.0\times10^{-6}$ $K^{-1}$.

24. A gain fiber for amplification of an optical signal, comprising:

A fiber 2–10 cm in length, said fiber having a core and an inner cladding of similar multi-component glass compositions each comprising, A glass network former $P_2O_5$ in mole percent $P_1$ from 50 to 75 percent, A glass intermediator XO selected from the oxide group consisting of $Al_2O_3$, $B_2O_3$, $Y_2O_3$, $La_2O_3$, and mixtures thereof in mole percent $P_2$ from 5 to 15 percent, and A glass modifier MO selected from BaO, BeO, MgO, SrO, CaO, ZnO, PbO and mixtures thereof in mole percent $P_4$ from 20 to 41 percent, Wherein the core further comprises a rare earth dopant selected from $Er_2O_3$, $Yb_2O_3$ and mixtures thereof.

* * * * *